United States Patent

[11] 3,554,471

[72] Inventor Ralph Eugene Hantzsch
 Los Alamitos, Calif.
[21] Appl. No. 838,860
[22] Filed July 3, 1969
[45] Patented Jan. 12, 1971
[73] Assignee The United States of America as represented by the Secretary of the Air Force

[54] SHOCK ABSORBING ADJUSTABLE BUMPER DEVICE FOR ROTATABLY ADJUSTING AIRCRAFT EJECTION SEAT CATAPULT ROCKET DEVICES
 3 Claims, 5 Drawing Figs.
[52] U.S. Cl. ................................................ 244/122
[51] Int. Cl. ...................................................... B64d 25/10
[50] Field of Search ........................................... 244/122,
 122.11, 122.12, 122.13, 122.14, 122.15, 122.17, 122.18

[56] References Cited
 UNITED STATES PATENTS
3,417,947 12/1968 Valentine..................... 244/122

Primary Examiner—Milton Buchler
Assistant Examiner—C. A. Rutledge
Attorneys—Harry A. Herbert, Jr. and Charles H. Wagner ABSTRACT: A bumper device which includes an arcuately movable saddle member on a support that is carried on the back of an aircraft ejection seat for impingement by a rotatably adjustable seat ejection rocket barrel. The rocket barrel is attached to the rear of the upper portion of the ejection seat structure and is initially carried in and projected from a catapult barrel that is secured at its lower end to the aircraft structure in back of the lower portion of the ejection seat. The saddle member has rollers between it and its support and is resiliently centered on the support and impinged by the forward movement of the lower portion of the rocket barrel. When the rocket barrel leaves the catapult barrel, it seats in the saddle which is adjustable by, and with, the rotative adjustment of the rocket barrel about its axis, to a limited degree. The rocket barrel has an inclined thrust nozzle at its lower end which inclines downwardly and rearwardly away from the back of the ejection seat and stresses the barrel toward the saddle. A gyroscope device is carried by the seat structure and connected to the rocket barrel, and is responsive to "yaw" movements of the seat when ejected to rotatably adjust the rocket barrel to direct the thrust of the jet from the rocket in a direction to resist, or correct, any relative rotative movements of the ejected seat about its "yaw" axis.

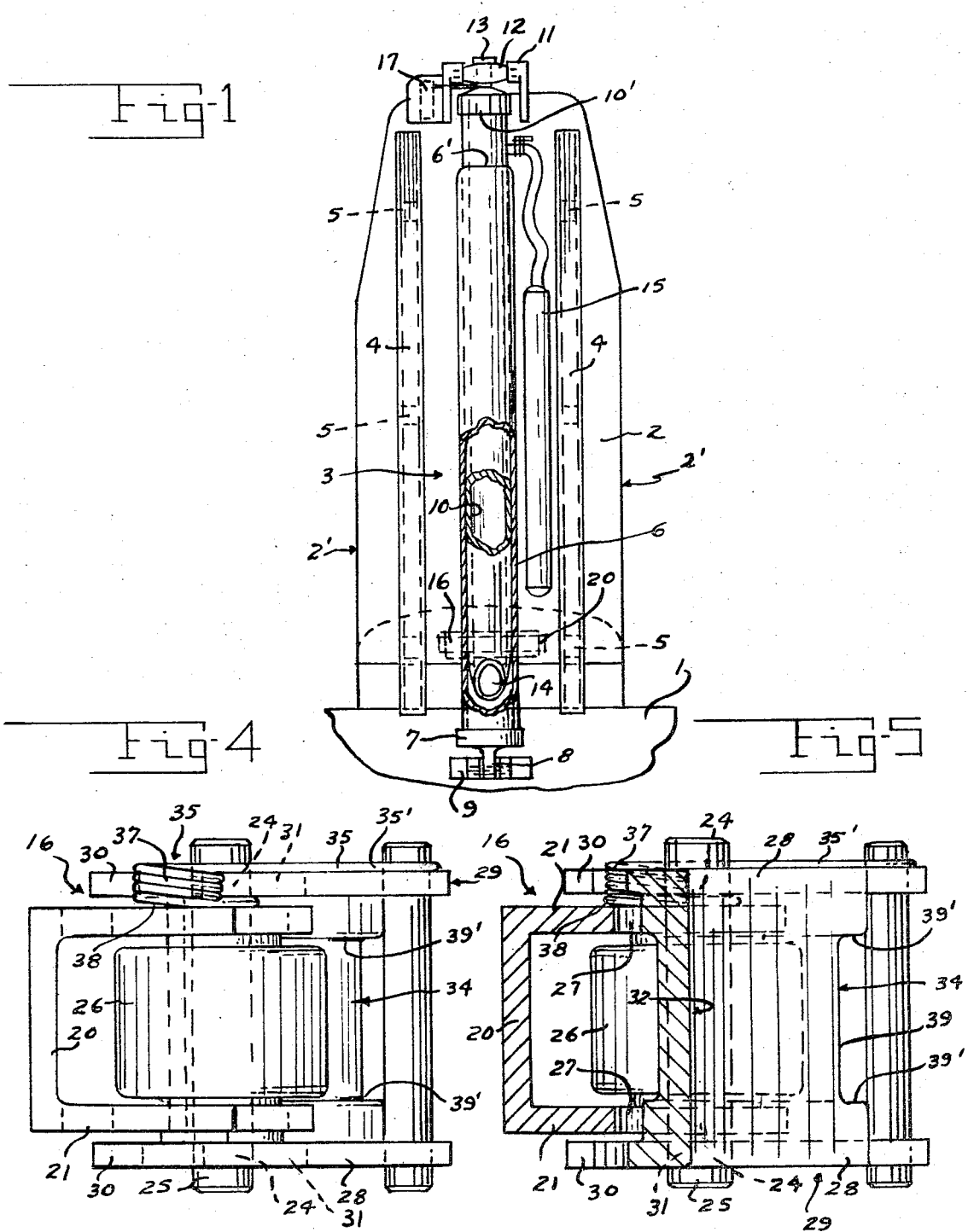

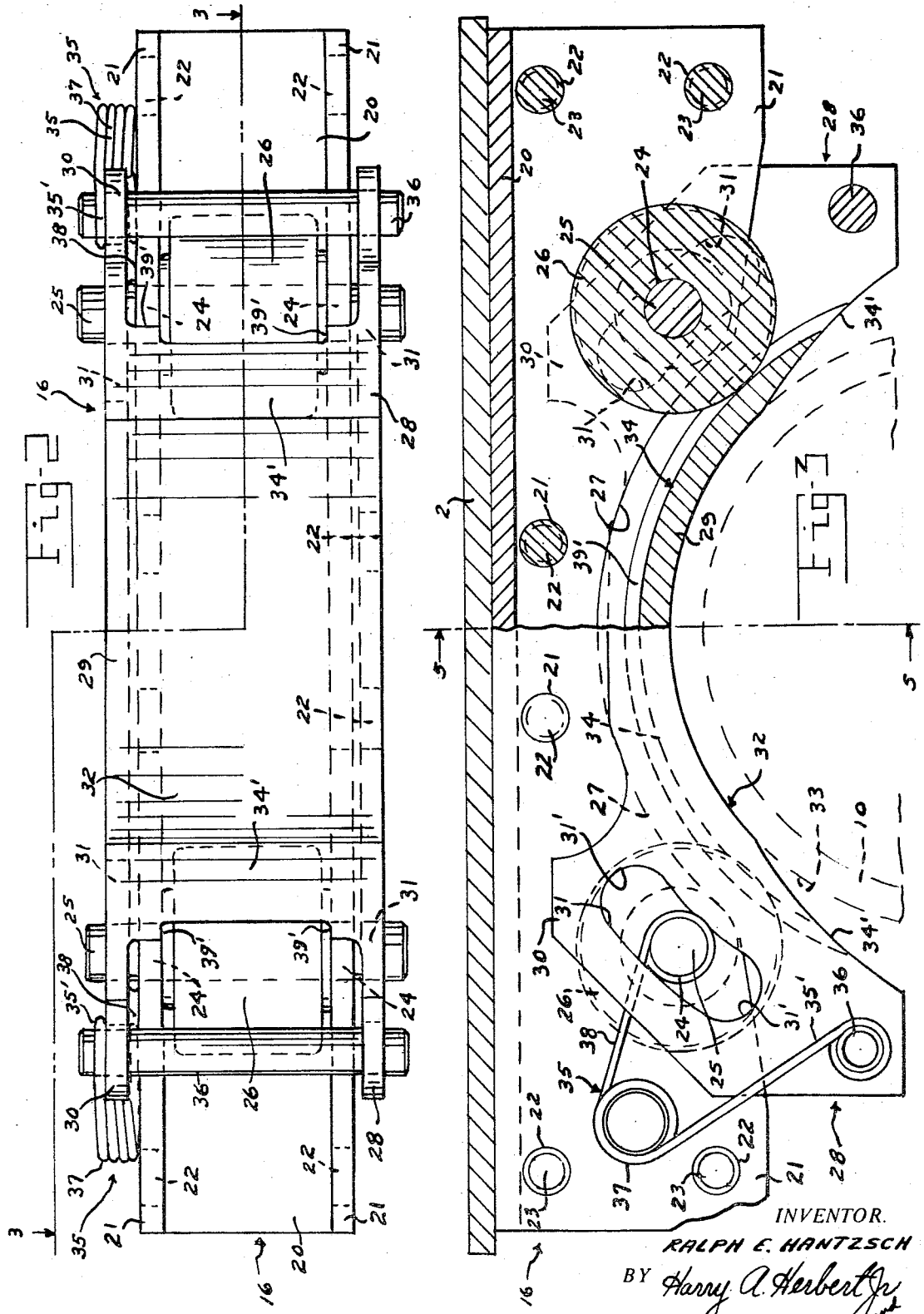

SHOCK ABSORBING ADJUSTABLE BUMPER DEVICE FOR ROTATABLY ADJUSTING AIRCRAFT EJECTION SEAT CATAPULT ROCKET DEVICES

BACKGROUND OF THE INVENTION

Ejection seats for high-speed aircraft for ejecting the pilot and his seat in emergencies are well known. For instance, U.S. Pat. Nos. 3,124,324 to Martin; 2,931,598; and Sanctuary; and 3,362,662, McIntyre et al., disclose types of ejection seats in which the seat is catapulted in a vertical direction out of an aircraft by a rocket motor or ejection device. The patent to McIntyre et al. discloses a jet ejected pilot's seat structure which employs two jet motors which are both carried by the seat as it is ejected and contemplates means for stabilizing the seat against undesirably "pitch" movements.

SUMMARY OF THE INVENTION

This invention contemplates the provision of an arcuately shiftable bumper device which includes a support that is secured to the back of an aircraft ejection seat, adjacent the bottom thereof, about midway between the sides thereof. The seat al., rocket barrel is secured or hinged to the back of the top portion of the seat, and extends downwardly in back of the seat below the bumper device support. This rocket ejection barrel is cylindrical and rotatably adjustable about its longitudinal axis with a relatively downward and rearward inclined jet discharge nozzle at its lower end, and discharges downwardly and rearwardly away from the back of the ejection seat. A rocket catapult barrel is secured at its lower end to the aircraft structure adjacent the bottom portion of the seat and extends upwardly, in back of the seat, past the bumper device support and telescopically receives the rocket jet seat ejector motor barrel therein through the upper end thereof.

The seat ejection rocket motor is rotatably adjustable about its longitudinal axis to adjust the angular direction of the rearward jet discharge or thrust therefrom with respect to the back of the ejection seat when the seat is ejected thereby. The bumper device support is, of course, disposed on the back of the seat structure between the back of the seat and the bottom portion of the catapult barrel (and the lower portion of the seat ejection rocket barrel therein) and is located directly in front of the central or longitudinal axis of the seat ejection rocket barrel. The bumper support carries a curved impact receiving saddle which receives the forward impact and thrust of the lower end of the seat ejection rocket barrel thereon when it leaves the rocket catapult barrel. This saddle is rotatably adjustable with and by the rocket barrel around the central axis of the rocket barrel on rollers which are interposed between the bumper device support and the saddle to provide for substantially antifrictional rotative adjustment of the rocket barrel about its longitudinal axis. Resilient means are provided between the bumper device support and the saddle to normally resiliently "center" the saddle on the support in front of the seat ejection rocket and catapult barrels.

The seat carries gyroscope means which is connected to the rocket barrel for controlling or adjusting the rotative position of the rocket barrel and its rearwardly inclined jet discharge during the ejection of the seat from the aircraft by the rocket to control and resist any undesirable "yaw" movements of the seat, as it is ejected and leaves its seat ejection tracks.

This invention primarily relates to the shock or impact absorbing adjustable bumper device for rotatably adjustable catapult devices for aircraft ejection seats.

An object of the invention is the provision of an adjustable bumper device for absorbing forward thrust of a seat ejection rocket barrel that is journaled at its upper end to the back of the top portion of the seat and extends downwardly toward the bottom of the back of the seat with a downward and rearwardly inclined thrust discharge opening in its lower end discharging downwardly and rearwardly away from the back of the ejection seat in which the bumper device is mounted on the back of the seat for absorbing forward thrust and impact of the rocket barrel incident to forward movement of the lower end of the barrel toward the back of the ejection seat when it leaves its catapult barrel, in which an arcuately movable saddle member is carried on the back of the seat for seating the lower end of the rocket barrel therein, and is arcuately adjustable on the back of the seat concentrically about the center axis of the rocket barrel while seated in the saddle member by rotative adjustment of the rocket barrel, and includes roller means between the saddle member and the back of the seat to permit free arcuate adjustment of the saddle member on the back of the ejection seat by rotative adjustment of the rocket barrel during upward and forward ejection of the seat out of an aircraft by said rocket barrel.

BRIEF DESCRIPTION OF THE DRAWING 12

Like reference characters refer to like parts on the several FIGS. of the drawings, in which:

FIG. 1 is a fragmentary, and somewhat diagrammatic, rear view of an aircraft ejection seat and rocket and catapult ejection means, showing the adjustable bumper device of the invention for the catapult and ejection rocket barrels applied thereto;

FIG. 2 is a somewhat enlarged plan view of the shock or impact absorbing bumper device, detached from the back of the ejection seat, and looking toward the adjustable saddle portion thereof;

FIG. 3 is a side view of the structure shown in FIG. 1, taken about on the plane indicated by line 3–3 of FIG. 2 and looking in the direction of the arrows, to show the right hand portion thereof in section;

FIG. 4 is an end view of the rocket barrel impact bumper device shown in FIG. 3; and FIG. 5 is a somewhat similar, but sectional, view taken about on the plane indicated by line 5–5 of FIG. 3, looking in the direction of the arrows.

Referring initially to FIG. 1, the reference numeral 1 denotes a portion of the aircraft structure on which the ejection seat 2 is mounted for vertical, or more accurately for upward, ejection through the top of the aircraft structure, through a suitable removable closure or canopy (not shown). The seat structure 2 is preferably ejected by a catapult and rocket barrel structure indicated generally at 3 and guided upwardly out of the aircraft by suitable guide means, such as guide rails 4, which are secured to the aircraft structure 1 in back of and below the ejection seat structure 2.

Suitable guide means, such as slide blocks or rollers 5, carried by back of the seat 2 slidably engage the guide rails 4. Also suitable releasable locking means (not shown) may be provided for retaining the ejection seat 2 in the aircraft, until intentionally released by the occupant in case of an emergency in which ejection of the seat out of the aircraft becomes necessary. The rocket ejection seat, of course carries suitable drogue and main parachutes which are ejected upwardly above the seat for deployment as the result of seat ejection, but these parachutes or lowering devices form no part of, or association with, the invention, and are therefore omitted from the drawings.

The rocket and catapult structure 3 comprises an outer cylindrical catapult barrel 6 which extends downwardly in back of the center of the ejection seat 2 from the top portion thereof, and is secured at its lower end 7 by any suitable means 8, for instance, to bracket members 9 which are fixed to the aircraft structure 1 behind and below the ejection seat 2.

The bracket members 9 project rearwardly away from the back of the seat supporting aircraft structure 1 to support the catapult barrel 6 substantially midway between the opposite side edges 2 of the back of the seat 2.

This catapult barrel 6 extends upwardly toward the top portion of the back of the seat 2 and may be pivoted to swing in a vertical plane through the longitudinal center of the seat as shown, if desired. The upper end 6' of the catapult barrel 6 telescopically receives the seat ejection rocket barrel 10 therein.

The seat ejection rocket barrel 10 is adjustable secured at its upper end 10' to spaced rearwardly extending brackets 11 located at the top of the back of the seat, and connected as shown to the brackets 11 for limited pivotal, as well as rotative, adjustment by the pivoted block 12 and trunnion 13.

The cylindrical rocket barrel 10 extends downwardly and telescopically within the catapult barrel 6 toward the bottom thereof and has a rocket thrust discharge port or opening 14 at its lower end which extends in a direction downwardly and rearwardly away from the back of the lower portion of the ejection seat 2, and located adjacent the bottom of the ejection seat and adjacent the bottom of the lower end of the interior of the catapult barrel 6 (before the rocket barrel 10 is ejected therefrom). Any suitable or conventional means (not specifically shown) may be provided for selectively "firing" the rocket 6 under command of the occupant of the seat 2 to eject the seat out of the aircraft. For instance, a high-pressure explosive source within a cartridge or cylinder 15, and carried by the back of the seat might be triggered by the seat occupant to supply this seat ejection source. When the rocket barrel 10 is catapulted upwardly out of the catapult barrel 6, and the ejection seat 2 leaves its guide rails 4-4, this rearward and downward jet force through the thrust discharge opening 14 provides an upward and forward ejection thrust on the seat 2 and its occupant. This forward thrust on the lower end of the barrel moves the lower end of the barrel 6 forwardly toward the back of the seat and against the impact and thrust absorbing bumper means of the invention, indicated generally at 16 and located in front of the lower end of the rocket barrel 6 and above the opening 14 to receive the impact of the lower end of the rocket barrel 10 as it leaves the upper end of the catapult barrel or tube 6 and moves forwardly under influence of the downward and rearward jet thrust out of the opening 14.

The rocket barrel 10 as previously mentioned is rotatably adjustable in its upper pivoted support 12 so as to adjust the rearward component of the jet thrust through the opening 14 to the right or left of a central plane through the longitudinal center of the seat, normal to the seat back to resist "yaw" movements of the seat 2 as it leaves its guide rails 4. Since the center of "gravity" of the seat 2 is ahead of the center of effort or thrust of the rocket barrel, there is naturally a tendency for the seat to "yaw" or rotate about its vertical axis during the time that the seat ejection rocket is operated. Rotative adjustment of the rocket barrel is designed to correct this "yaw" rotation of the seat. As further background a caged "rate" gyroscope 17 is fixed to the top of the back of the seat with an actuating connection therefrom to an actuating arm projecting from the top of the rocket barrel 10 toward the back of the seat to normally hold the barrel 10 with its discharge opening 14 extending rearwardly in a vertical plane normal to the back of the seat 2, or as near as possible in the vertical plane through the seat containing the cg (center of gravity) of the seat and its occupant. As the seat is ejected, the gyroscope rotor is brought up to its necessary spin rotation and the gyroscope is uncaged, and will tend to rotatably adjust the barrel to direct the thrust thereof in the desired direction to counteract any "yaw" action or rotation of the seat, during its upward and forward ejection, and while the lower end of the barrel is in contact with the bumper device of this invention. Any appreciably friction or resistance by the bumper device on the lower portion of the exterior of the cylindrical barrel 10, during the rotative adjustment thereof by the gyroscope, would be highly objectionable. The subject invention provides an impact bumper and positioning device, including an adjustable saddle member, for receiving the lower end of catapult barrel 6 before the seat 2 is ejected, and then receiving and seating the lower end of the rocket barrel 10 therein to prevent any lateral movement of the lower end portion of the rocket barrel 10, but at the same time permitting free rotative adjustment of the barrel 10 while in contact therewith, by the gyroscope 17.

The bumper device 16, as shown in detail in FIGS. 2 to 5, comprises an elongated supporting base plate or member 20 having spaced parallel side flanges 21 projecting outwardly therefrom. The base plate 20 is adapted to be suitably secured to the back of the seat 2 by any suitable securing means and extends across the seat back in front of the lower portions of the rocket and catapult barrels 6 and 10 at right angle to the axis of the barrels, with the ends of the supporting plate 20 projecting beyond the opposite sides of the barrels. The side walls or flanges 21 may be formed with apertures 22 therein for receiving pins 23 or suitable securing means for fixing the base or supporting plate 20 to the back of the seat. The flanges 22 are also apertured at 24 to receive roller supporting shaft member 25 on which supporting rollers 26 are journaled.

The side flanges 21 have their intermediate outer portion concavely curved or cut away as indicated at 27 to provide clearance for an adjustable saddle member, indicated generally at 28, having an arcuately curved saddle plate portion 29 extending across the supporting base plate 20 and beyond the opposite parallel side flanges 21 thereof, with parallel side flanges 30 projecting from the saddle plate adjacent the outer surfaces of the flanges 21. These side flanges 30 are formed with arcuate slots 31 which are concentric to the axis of the curvature of the saddle plate portion 29. This curved portion is formed with an outer concave arcuate impact bearing surface 32 shaped to receive and fit the outer cylindrical surface 33 of the seat ejection rocket barrel 10, as shown in dotted lines in FIG. 3, and an inner convex concentric roller bearing surface 34 on which the rollers 26 contact and ride, with the opposite ends of the shaft members 25 projecting into the arcuate slots 31.

The opposite end portions of the arcuate saddle plate 29 and the side flanges 28 are arcuately curved away from the curved portion or surface 32 as indicated at 34' so as to guide the rocket barrel 10 into the curved barrel receiving portion 32 and properly seat the cylindrical surface of the barrel 10 therein.

From the above it will be observed that when the lower portion of the rocket barrel 10 moves forwardly into contacting and seating position in the concave portion 32 of the saddle member 28, the arcuate slots 31 are substantially concentric to the central axis of the barrel 10 with the rollers 26 engaging the convex bearing surface 34 of the saddle member 28. This arrangement provides for substantially free rotative adjustment of the rocket barrel 10 and the saddle member 28 on its supporting base plate 20 about the axis of the rocket barrel and resists any lateral movement of the lower end of the barrel.

The ends 31' of the slots 31 limit the amount of rotative movement of the saddle member 28. Spring means 35 are provided between the supporting base plate 20 and the saddle member 28 for resiliently tensioning the saddle member 29 toward a mid position between the opposite ends of the supporting base plate, and to tension the saddle member 29 into contacting relation with the saddle supporting rollers 26, as seen in FIGS. 2 and 3.

The spring means 35, as shown, comprises a spring wire having one end 35' curled around one end of the cross pin 36 on the outer side of the saddle plate side flange 30, then curled at 37 with the opposite ends 38 extending in between the side flanges 21 and 28 with their free end curled around the roller supporting shaft members 24, and tensioned to pull the opposite ends of the saddle member 29 toward the supporting base plate. Since the ends 35' of the springs 35 are connected to the pins 36 extending through the ends of the side flanges of the saddle plate 28 at one end and connected at their other end to the roller shafts 25, which are located in the supporting base side flanges 21, and are closer to the central plane of the bumper device than the spring connections 35' to the pins 36, it is obvious that the springs 35 not only draw the saddle member 28 down on the rollers 26 but also tension the saddle member toward its normal centralized position, as shown in FIG. 3. Suitable spacer washers may be provided between the sides of the rollers 26 and the inner surfaces of the side flanges 21, also the arcuate concave roller bearing surface 34 may be channeled as indicated at 39, to a width to freely receive the rollers 26 therebetween with the sides 39' of the channels 39 disposed to position the rollers 26 in spaced relation to the inner faces of the flanges 21 of the supporting base plate 20.

I claim:

1. A shock absorbing bumper device, for a rotatably adjustable seat ejection rocket barrel for an aircraft ejection seat which is secured to the back of the top portion of said ejection seat and extends downwardly in back of the center of said seat toward the bottom thereof intermediate the side edges of the seat and is journaled for limited rotative adjustment about its central axis with a jet thrust discharge opening in the lower end thereof inclining downwardly and rearwardly away from the back of the ejection seat stressing said lower end of the rocket barrel toward the back of said seat, said bumper device comprising an elongated saddle member supporting base plate, adapted to be secured to the back of the ejection seat in front of the lower end portion of said pocket barrel, said base plate having spaced substantially parallel side flanges projecting outwardly from the opposite side edges thereof substantially normal to said supporting base plate, an elongated shiftable saddle member movable on said supporting base plate comprising an arcuately curved thrust bearing plate having an outer concave thrust receiving surface shaped to receive the lower portion of the seat ejection rocket barrel therein, upon movement of said barrel lower end toward the seat back and an inner substantially concentric arcuately curved convex bearing surface, formed with spaced parallel side flanges projecting from the opposite side edges of said curved thrust bearing plate in overlapping parallel relation adjacent the outer surfaces of said supporting base plate side flanges, said saddle member side flanges having elongated arcuately curved guide slots therein adjacent the opposite ends thereof located in concentric relation to said cylindrically curved convex bearing surface of said arcuately curved thrust bearing plate of said elongated movable saddle member, cylindrical roller supporting parallel shaft members carried by the opposite ends of said supporting base plate with the opposite ends of said shaft members movably disposed midway in said guide slots between the opposite ends thereof, cylindrical thrust supporting rollers disposed on said shaft members between the opposite side flanges of said supporting base plate with their peripheries in contact with said arcuately curved convex bearing surface, and spring means operable between said shiftable saddle member and said roller supporting shaft members, for resiliently centering said saddle member on said supporting base plate, to yieldably urge the projecting shaft members in said curved slots to positions substantially midway between the opposite ends of said slots.

2. In combination with an aircraft ejection seat having a rocket motor for ejecting said seat upwardly and forwardly out of the aircraft including a seat ejection rocket comprising a cylindrical rocket barrel secured at its upper end to the top portion of the back of said seat and extending downwardly substantially midway between the side edges of the seat toward the bottom thereof having a jet thrust discharge opening in the lower end thereof discharging downwardly and rearwardly away from the back of the seat when the rocket is fired, for ejecting said seat upwardly and forwardly out of an aircraft and stressing the lower end of said rocket barrel forwardly toward the bottom of the back of the seat, an elongated thrust impact absorbing bumper device fixed on the back of said ejection seat between the seat back and said lower end portion of said rocket barrel comprising, and elongated supporting base plate fixed to the back of the seat, between the seat back and the lower end portion of the rocket barrel, transversely to the barrel axis, said elongated base plate having transversely spaced substantially parallel side flanges projecting outwardly from the opposite edges of said base plate away from the back of the seat normal to the longitudinal axis of said rocket barrel, and beyond the opposite sides of said rocket barrel, an elongated thrust receiving saddle member straddling said base plate for longitudinal adjustments thereon by said barrel comprising an arcuately curved elongated thrust bearing plate having an outer concave thrust receiving surface shaped intermediate its ends to receive the lower end portion of said seat ejection rocket barrel therein upon movement thereof toward the back of said seat and formed with a substantially cylindrical inner convex bearing surface and laterally spaced parallel side flanges projecting therefrom in adjacent overlapping parallel relation to said supporting base plate side flanges having arcuately curved guide slots formed in the opposite ends thereof extending concentric to said cylindrically inner curved convex bearing surface, roller supporting shaft members extending through said base plate side flanges into said arcuate slots in said saddle member intermediate the ends of said slots, cylindrical thrust impact rollers carried on said shaft members between said base plate side flanges in contact with said inner cylindrical curved convex bearing surface of said saddle member, and spring means operable between the opposite end portions of said longitudinal supporting base plate and said saddle member resiliently urging said saddle member to a mid position intermediate the opposite ends of said base plate, with said shaft members disposed in said slots substantially midway between the opposite ends of the slots, whereby free yieldable movement of said saddle member on said base plate by said rollers, by rotative adjustment contact thereof by the barrel is limited by the opposite ends of the slots.

3. A bumper device comprising an elongated supporting base plate having transversely spaced parallel side flanges projecting from the opposite sides of said baseplate, a shiftable arcuate saddle member straddling said side flanges comprising, an arcuately curved impact receiving plate intermediate the ends of said side flanges, extending beyond the opposite sides of the supporting base plate having an inner convex thrust receiving cylindrical surface facing said supporting base plate in spaced relation thereto having spaced parallel side flanges projecting therefrom toward said supporting base plate in adjacent overlapping spaced relation to the outer surfaces of said base plate parallel side flanges, said saddle member having an outer concave thrust impact receiving surface substantially concentric to said convex cylindrical surface, elongated arcuate guide slots formed in the opposite ends of each of said saddle member side flanges in concentric relation to the cylindrical curvature of said inner thrust receiving surface, said supporting base plate side flanges having transversely aligned shaft receiving apertures therethrough formed in the opposite end portions thereof, thrust roller supporting shaft members extending through said shaft receiving apertures, with the opposite ends of said shaft members projecting into said guide slots, cylindrical thrust impact receiving rollers disposed on said shaft members between said supporting base plate side flanges with the peripheries of said rollers in contact with said cylindrically curved convex surface of said saddle member, and spring means extending between each of the ends of said shaft members, and the opposite ends of said saddle member side flanges, urging said saddle member for centering movement intermediate the opposite ends of said base plate.